United States Patent [19]
Gooch

[11] Patent Number: 5,282,489
[45] Date of Patent: Feb. 1, 1994

[54] FLUID PRESSURE MODULATOR
[75] Inventor: Robert E. Gooch, Orem, Utah
[73] Assignee: Valtek, Inc., Springville, Utah
[21] Appl. No.: 877,847
[22] Filed: May 1, 1992
[51] Int. Cl.$^5$ .................. G05D 16/20; F16K 31/06
[52] U.S. Cl. .................................... 137/85; 137/82; 251/129.21
[58] Field of Search ............... 137/82, 85; 251/129.21

[56] References Cited
U.S. PATENT DOCUMENTS

| | | | |
|---|---|---|---|
| 3,791,379 | 2/1974 | Janu | 137/82 |
| 4,369,804 | 1/1983 | Bouvet | 137/85 |
| 4,579,137 | 4/1986 | Brandt | 137/82 X |
| 4,874,005 | 10/1989 | Potter | 137/85 |
| 5,086,980 | 2/1992 | Hickey | 251/129.21 X |

Primary Examiner—Gerald A. Michalsky
Attorney, Agent, or Firm—Thorpe North & Western

[57] ABSTRACT

A pressure modulator includes an electromagnetic coil wire wound about a hollow axle for developing a magnetic field when electrical current is applied to the wire, the hollow of the axle having an entrance port for receiving a fluid and a discharge port for discharging the fluid. The modulator serves to control the pressure of fluid flowing through a conduit under pressure and further includes a bleed-off tap connecting the conduit to the entrance port. A diaphragm plate is disposed above the coil of wire and axle and adjacent to the discharge port of the hollow to modulate the rate of fluid flow from the discharge port. The diaphragm plate includes a central void, a central section of magnetically attractable material disposed in the void above the coil of wire for attraction toward the coil when electrical current is applied to the coil to thereby limit the amount of fluid which is allowed to escape from the discharge port. The diaphragm plate also includes a pair of legs which extend from the periphery of the plate to the central section to hold the central section in place, and a biasing element disposed between the legs for selectively moving the central section toward or away from the coil of wire to provide a beginning position for the central section from which the central section will be attracted towards the coil.

11 Claims, 1 Drawing Sheet

FLUID PRESSURE MODULATOR

BACKGROUND OF THE INVENTION

This invention relates to a fluid pressure modulator for use, for example, in a current to pressure transducer system.

Current to pressure transducer systems have been used for some time to control output fluid pressure in a fluid carrying line. This control is effected by controlling bleed-off of the fluid in some type of pressure modulating device. The pressure modulating device, which is controlled by an electrical input signal, is connected to the fluid-carrying line to increase the bleed-off if less output pressure is desired and to decrease the bleed-off if a greater output pressure is desired. A pressure sensor senses the fluid output pressure and supplies an electrical signal representing that pressure to a comparator. The electrical input signal, whose value is to determine the output fluid pressure, is also supplied to the comparator and compared to the signal representing the sensed output pressure. If there is a difference between the two compared signals, the comparator supplies an electrical adjustment signal to the pressure modulator to either increase or decrease the bleed-off so that as to bring the output fluid pressure closer to the desired output pressure as represented by the value of the electrical input signal. In this manner, the fluid output pressure can be controlled and varied by varying the value of the electrical input signal. The above current to pressure transducer system is fairly conventional and systems similar to this, or at least component parts useable in such systems, are disclosed in U.S. Pat. Nos. 4,534,376, 4,481,967, 4,492,246, 4,325,399, 4,653,523, and 4,636,830.

Although there exist a variety of systems for controlling the output fluid pressure in a fluid carrying line by controlling bleed-off of the fluid, such systems oftentimes lack accuracy and precision, are sensitive to vibration, are sensitive to the mounting of the pressure modulating device, either do not allow for calibration or calibration is complicated, and generally are complicated in design and operation.

SUMMARY OF THE INVENTION

It is an object of the invention to provide a fluid pressure modulator especially suitable for use in current to pressure transducer systems.

It is another object of the invention to provide such a fluid pressure modulator which is very accurate and precise in controlling pressure in a fluid pressure line by bleed-off.

It is a further object of the invention to provide such a fluid pressure modulator which is insensitive to the mounting position of the modulator relative to the fluid carrying line.

It is an additional object of the invention to provide such a fluid pressure modulator which may be simply and easily calibrated.

It is still another object of the invention to provide such a fluid pressure modulator which is simple in design, construction and operation.

The above and other objects of the invention are realized in a specific illustrative embodiment of a pressure modulator for modulating the pressure of gas flowing through a conduit. The modulator includes an electromagnetic device responsive to an electrical current for developing a magnetic field whose strength varies with variation in the magnitude of the electrical current, and an armature made of, or a portion made of, a resilient magnetically attractable material. The armature includes a base part fixedly positioned relative to the electromagnetic device, a flapper element cantilevered from the base into the magnetic field to move toward or away from the electromagnetic device depending upon the strength of the magnetic field, and means for selectively biasing the flapper element toward or away from the electromagnetic device. An orifice is disposed in the direction of movement of the flapper element to direct gas theretowards, with the flow rate of gas from the orifice varying with variation in the distance of the flapper element from the orifice. Gas is conveyed from the conduit to the orifice so that variation in the flow rate of gas to the orifice serves to vary the pressure of the gas in the conduit.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
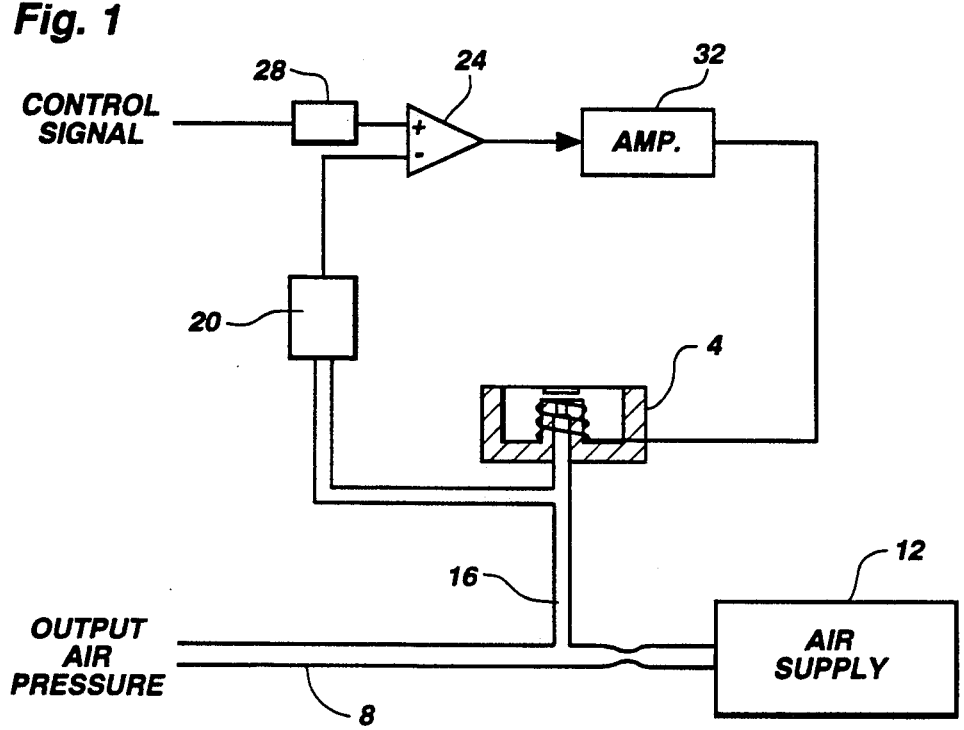
FIG. 1 is a schematic view of a current to pressure transducer system with which the pressure modulator of the present invention may be used.

FIG. 1 shows a current to pressure transducer system in which a pressure modulator 4, made in accordance with the present invention, could be utilized. The system controls the output pressure in a conduit 8 which is supplied with air by an air supply 12. A bleed-off line 16 carries air to the pressure modulator 4 which controls the amount of air allowed to escape from the line 16 through the modulator to thereby control the pressure in the conduit 8. A pressure sensor 20 senses the air pressure in the line 16 and thus in the conduit 8 and supplies an electrical signal representing this pressure to a comparator 24. An electrical control signal is also supplied via a filter 28 to the comparator 24 with the control signal representing the desired output air pressure in the conduit 8. The comparator 24 compares the measured air pressure (represented by the signal from the pressure sensor 20) with the desired air pressure (represented by the control signal supplied by the filter 28), and supplies an electrical adjustment signal to an amplifier 32 for supply to the pressure modulator 4. The purpose of this adjustment signal is to cause the pressure modulator 4 to either increase or decrease the bleed-off of air through the line 16 so as to bring the output fluid pressure in the conduit 8 closer to the desired output pressure represented by the value of control signal.

Figure 2:
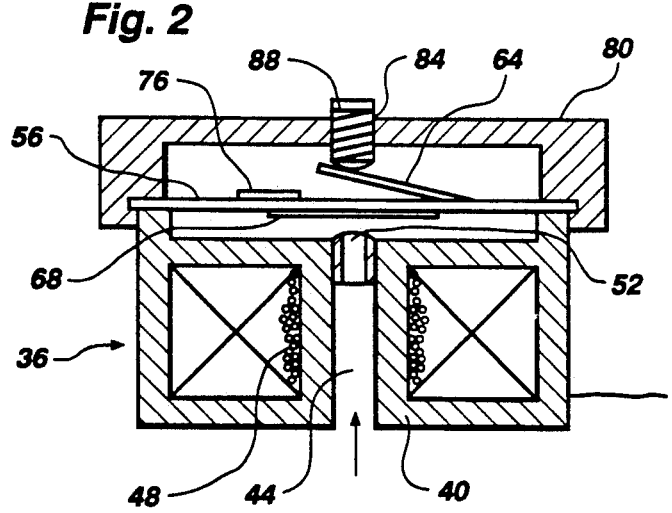
FIG. 2 is a side, cross-sectional view of a pressure modulator made in accordance with the principles of the present invention.

Referring now to FIG. 2, there is shown a side, cross-sectional view of a pressure modulator made in accordance with the present invention. The modulator includes a housing 36 having an axle or core 40 through the center of which extends a channel or bore 44, for carrying fluid. Wound about the core 40 is a coil of wire 48 for producing a magnetic field, and thus a magnetic attraction in a direction parallel with the bore 44, when supplied with an electrical current. A bore nozzle 52 is disposed at the upper end of the bore 44.

Disposed above the core 40 and above the nozzle 52 is a armature disk 56. The position of at least a portion of the armature disk 56, under control of the magnetic field produced by the coil 48, determines the amount of air allowed to flow through the bore 44 and escape from the nozzle 52.

Figure 3:
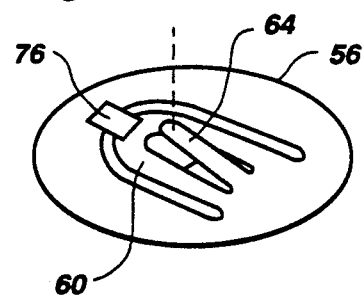
FIG. 3 is a perspective view of one embodiment of an armature disk which may be used with the pressure modulator of FIG. 2.
Figure 4:
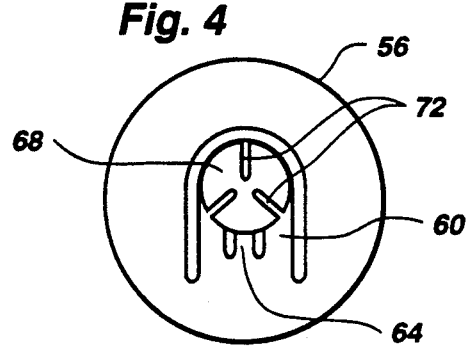
FIG. 4 is an underside view of the armature disk of FIG. 3.

The armature disk 56 is best seen in FIGS. 3 and 4 which show respectively a perspective view of the disk and a plan, underside view of the disk. Referring to FIG. 3, the disk 56 is shown to include a cut out, tongue-shaped flapper element 60 which extends from the periphery of the disk 56 to the center thereof. A second cut out, tongue-shaped element 64 extends from a location near the periphery of the disk 56 (but whose location is farther from the periphery than is the location from which the flapper element 60 extends) toward the center of the disk. This element 64 is a biasing spring element and is formed to extend at an angle upwardly from the plane defined by the armature disk 56, as best seen in FIG. 2. The biasing function will be described momentarily. Disposed on the underside of the flapper element 60 is a disk 68, made of a magnetically attractable material, and having three radially extending slots 72, as best seen in FIG. 4. The disk 68 is positioned directly above the nozzle 52, as shown in FIG. 2, and above the coil 48, and is attractable by the magnetic field produced by the coil. A damper pad 76 made of a resilient material such as neoprene rubber, is attached to the top of the armature disk 56 to extend to a location above the flapper element 60 to dampen vibrations of the flapper element.

Referring again to FIG. 2, the pressure modulator further includes a bridge 80 which extends from the edges of the housing 36 upwardly and over the center of the armature disk 56. A threaded bore 84 is formed in the bridge 80 to receive a biasing set screw 88 which may be screwed into the bore 84 to contact the upper side of the biasing element 64. When the biasing element 64 is forced downwardly, it causes the flapper element 60 to also move downwardly toward the coil 48 and nozzle 52. The set screw 88 is provided to initially set or calibrate the position of the flapper element 60 so that a certain current applied to the coil 48 will cause the coil to attract and deflect the flapper element 60 and disk 68 a certain distance toward the coil. Obviously, if the flapper element 60 is initially biased fairly close to the coil 48, then less current will be required to attract the flapper element and disk 68 to within a certain distance of the coil, whereas if the flapper element is not initially biased, then a greater current would be required to attract the flapper element and disk 68 to within the certain distance.

In the manner described, the amount of air flowing through the bore 44 of the pressure modulator, which is the amount of bleed-off from the conduit 8 (FIG. 1), is determined by the degree to which the coil 48 attracts the disk 68 towards the nozzle 52, and thus upon the amount of electrical current supplied to the coil. Provision of the biasing element 64 and set screw 88 allows for precise and accurate calibration of the pressure modulator and thus precise and accurate operation of the pressure control function. The slots 72 in the disk 68 are provided to allow the vented gas to escape without creating an adverse pressure gradient across the armature disk. This helps prevent aerodynamic oscillations.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A pressure modulator for modulating the pressure of gas flowing through a conduit, said modulator comprising electromagnetic means responsive to an electrical current for developing a magnetic field whose strength varies with variation in the magnitude of the electrical current, armature means made of a resilient material and including
 a base support fixedly positioned relative to the electromagnetic means,
 a flapper element at least a portion of which is made of a magnetically attractable material, said flapper element being cantilevered from the base into the magnetic field to move toward or away from the electromagnetic means depending upon the strength of the magnetic field, and
 means for selectively biasing the flapper element toward or away from the electromagnetic means, an orifice disposed in the direction of movement of the flapper element to direct gas theretoward, with the flow rate of gas from the orifice varying with variation in the distance of the flapper element from the orifice, means for conveying gas from the conduit to the orifice, such that variation in the flow rate of gas to the orifice serves to vary the pressure of gas in the conduit, wherein said flapper element comprises
 a tongue having a base end joined to the base support and a free end flexibly moveable toward and away from the orifice, and
 a tab formed centrally in the tongue to extend from the base support toward the free end of the tongue so that when the tab is moved toward or away from the orifice, the tongue is biased toward or away from the orifice, and wherein said biasing means is disposed to contact and selectively move the tab toward or away from the orifice.

2. A pressure modulator as in claim 1 wherein said electromagnetic means comprises a coil of wire wound about a core, wherein said orifice is disposed in the core adjacent the flapper element, and wherein the conveying means is disposed to convey gas from the conduit, through the core to the orifice.

3. A pressure modulator as in claim 1 wherein said biasing means comprises
 a bridging element disposed above the tab and including a threaded bore, and
 a set screw for screwing into and through the threaded bore to contact and move the tab toward or away from the orifice.

4. A pressure modulator as in claim 3 wherein said tab extends at an angle outwardly from the plane occupied by the tongue, away from the orifice toward and in contact with the set screw.

5. A pressure modulator as in claim 1 wherein said base support comprises a disk-shaped plate in which is formed the tongue to extend from an edge of the plate toward the center thereof.

6. A pressure modulator as in claim 1 further comprising damper means disposed adjacent to the tongue for dampening vibrations of the tongue caused by the flow of gas thereagainst.

7. A pressure modulator as in claim 1 further comprising a disk made of a magnetically attractable material disposed on the tongue o the underside thereof above the orifice.

8. A pressure modulator as in claim 7 wherein said disk includes a plurality of radial slots.

9. A pressure modulator having an electromagnetic coil of wire wound about a hollow axle for developing a magnetic field when an electrical current is applied to the wire, the hollow of the axle having an entrance port for receiving a fluid and a discharge port for discharging the fluid, a conduit for carrying a fluid under pressure, and means for tapping some of the fluid flowing in the conduit and conveying it to the entrance port to thereby vary the pressure of the fluid in the conduit, characterized in that the modulator further includes
a diaphragm plate means disposed above the coil of wire and axle and adjacent to the discharge port of the hollow to modulate the rate of fluid flow from the discharge port, said diaphragm plate means including
a plate having a central void,
a central section of magnetically attractable material disposed in the void above the coil of wire for attraction toward the coil when electrical current is applied to the coil to thereby limit the amount of fluid which is allowed to escape from the discharge port, and
at least one leg which extends from the periphery of the plate to the central section to hold the central section in place, and
a resilient damper pad attached to the plate, the damper pad extending to a location above the central section to dampen vibrations of the central section.

10. A pressure modulator as in claim 9 further including bias means disposed between the legs for selectively moving the central section toward or away from the coil of wire.

11. A pressure modulator as in claim 10 wherein said diaphragm plate means further includes a disk made of a magnetically attractable material and mounted on the underside of the central section adjacent the discharge port.

* * * * *